United States Patent [19]
Hakasalo

[11] Patent Number: 5,494,351
[45] Date of Patent: Feb. 27, 1996

[54] DEVICE AND METHOD FOR MIXING PEAT AND SLUDGE

[75] Inventor: Harri Hakasalo, Jyväskylä, Finland

[73] Assignee: Vapo Oy, Jyvaskyla, Finland

[21] Appl. No.: 407,265

[22] Filed: Mar. 20, 1995

Related U.S. Application Data

[63] Continuation of Ser. No. 191,710, Jan. 31, 1994, abandoned, which is a continuation of Ser. No. 960,772, Oct. 14, 1992, abandoned.

[51] Int. Cl.$^6$ ........................................ B01F 7/08
[52] U.S. Cl. ............... 366/318; 366/79; 366/85; 366/88
[58] Field of Search ............ 366/66, 79, 83–85, 366/88, 96–99, 156, 158, 167, 192, 193, 291, 292, 297–301, 156.1, 167.1; 222/413, 238

[56] References Cited

U.S. PATENT DOCUMENTS

| | | | |
|---|---|---|---|
| 375,165 | 12/1887 | Krutzsch | 366/300 |
| 771,141 | 9/1904 | Gesner | 368/301 |
| 1,755,674 | 4/1930 | Tauriainen | 366/300 |
| 2,631,016 | 3/1953 | Kraffe de Laubarede | 366/297 |
| 3,704,076 | 11/1972 | Bodunov | 366/156 |
| 3,868,093 | 2/1975 | Sokolow | 366/88 |
| 3,879,150 | 4/1975 | Brown | 366/301 |
| 3,942,768 | 3/1976 | Hughes | 366/297 |
| 4,105,147 | 8/1978 | Stubbe | 222/413 |
| 4,205,919 | 6/1980 | Attwell | 366/193 |
| 4,387,834 | 6/1983 | Bishop | 22/413 |
| 4,528,098 | 7/1985 | Treyssac . | |
| 4,847,007 | 7/1989 | Quieser | 366/79 |
| 5,156,790 | 10/1992 | Cucchisi | 366/88 |

FOREIGN PATENT DOCUMENTS

| | | | |
|---|---|---|---|
| 393703 | 4/1924 | Germany . | |
| 3145376 | 5/1983 | Germany | 366/79 |
| 3245831 | 11/1991 | Japan | 366/300 |
| 852580 | 8/1981 | U.S.S.R. | 366/66 |

*Primary Examiner*—David Scherbel
*Assistant Examiner*—Terrence R. Till
*Attorney, Agent, or Firm*—Jones & Askew

[57] ABSTRACT

A method and mixer for mixing peat and sludge into a homogenous mass, in which method the peat and sludge is mixed by pressurizing the pre-mixed mass for some time, when the sludge is absorbed by and bound in the peat. The mixer in accordance with the invention includes a silo (1) and a screw conveyor (4) located beneath it, from which the mass is squeezed out through a nozzle (10).

4 Claims, 3 Drawing Sheets

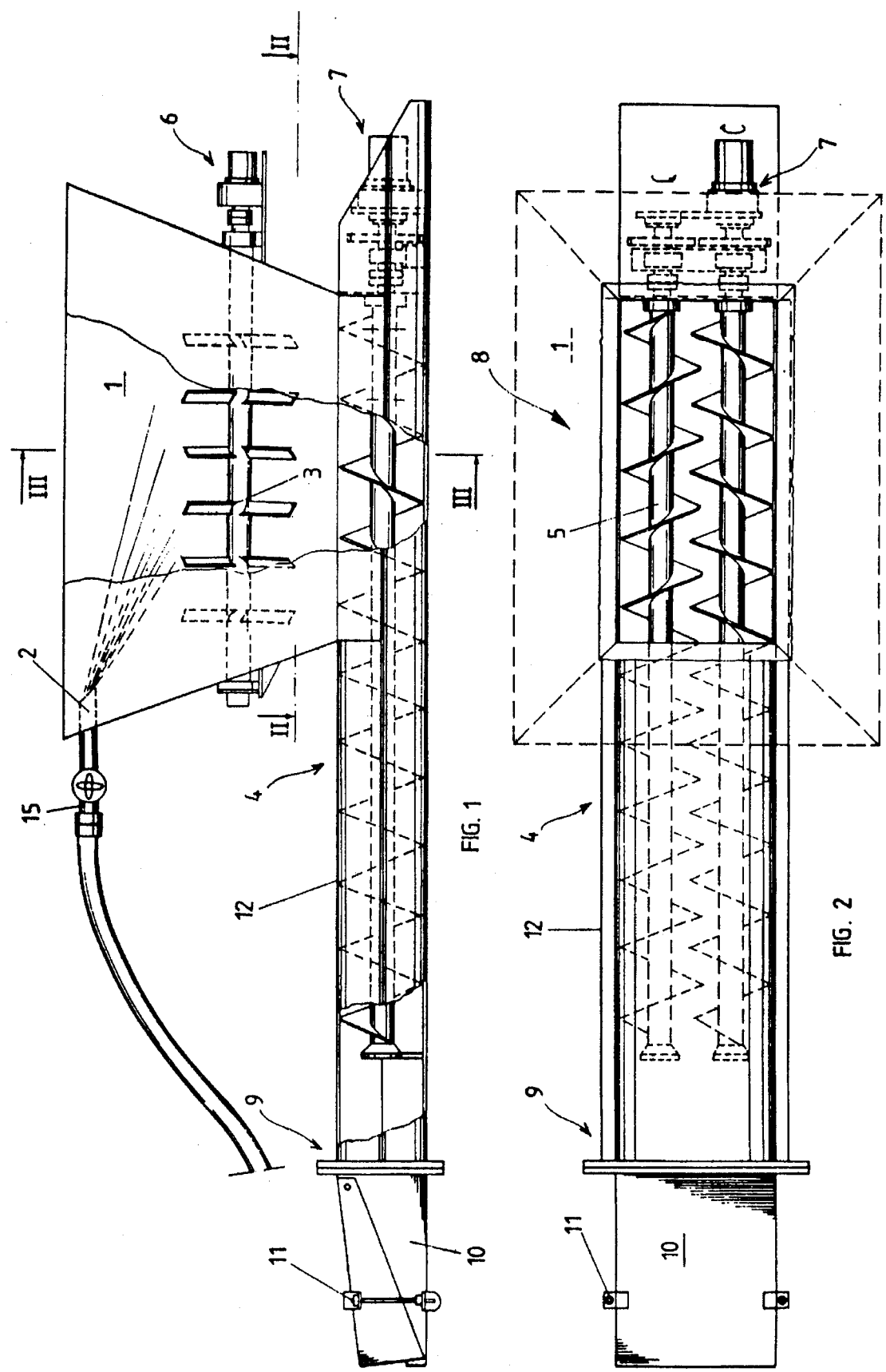

DEVICE AND METHOD FOR MIXING PEAT AND SLUDGE

This is a continuation of application Ser. No. 08/191,710, filed Jan. 31, 1994, which in turn is a continuation of application Ser. No. 07/960,772 filed Oct. 14, 1992 all abandoned.

The object of the invention is a method for mixing peat and sludge as a homogenous mass, in which the peat and sludge are mixed mechanically. The invention is also concerned with a device for realizing the method. Here peat also means any other substance, by means of which it is desired to bind the sludge, that has a great surface tension. Here sludge also means liquid manure.

Various kinds of sludges form a waste problem, because they cannot be put directly into the natural environment. In nature the sludges threaten surface and ground waters. Sludges can cause smell, taste, hygienic and eutrophy problems in the environment. The most usual sludges are waste water and septic tank sludges, as well as the liquid manure produced in agriculture.

Attempts have been made to mix sludge with various kinds of dry masses, especially with peat. A homogenous mixture of peat and sludge has shown itself to be very advantageous on account of the fact that the sludge liquids and nutrients bind themselves to peat very effectively. In practice, however, the mixing of peat and especially liquid manure has been very difficult. These do not mix naturally, the peat tending, even after mechanical treatment, to rise to the surface, nor does it, due to its great surface tension, suck the sludge into itself. Up until now mixing has taken place for example in such a way that the peat and liquid manure have been spread in layers as a mattress about 50 cm thick in a shallow pond. After this a tractor is driven several times on top of the mixture, when the final mixing and the sucking of the liquid manure into the cell structure of the peat has taken place. In practice this kind of method is laborious and slow, as well as expensive. The invention is based to a great extent on the realization that mixing takes place by raising the pressure of the mass to be mixed for a sufficiently long time, when the counter force caused by surface tension is overcome.

In what follows the invention is illustrated with the aid of the accompanying illustrations, which show various mixers in accordance with invention.

FIG. 1 shows a mixer seen from the side in partial cross-section

FIG. 2 shows a mixer seen from above, in cross-section at point II—II in FIG. 1

Figure 3:
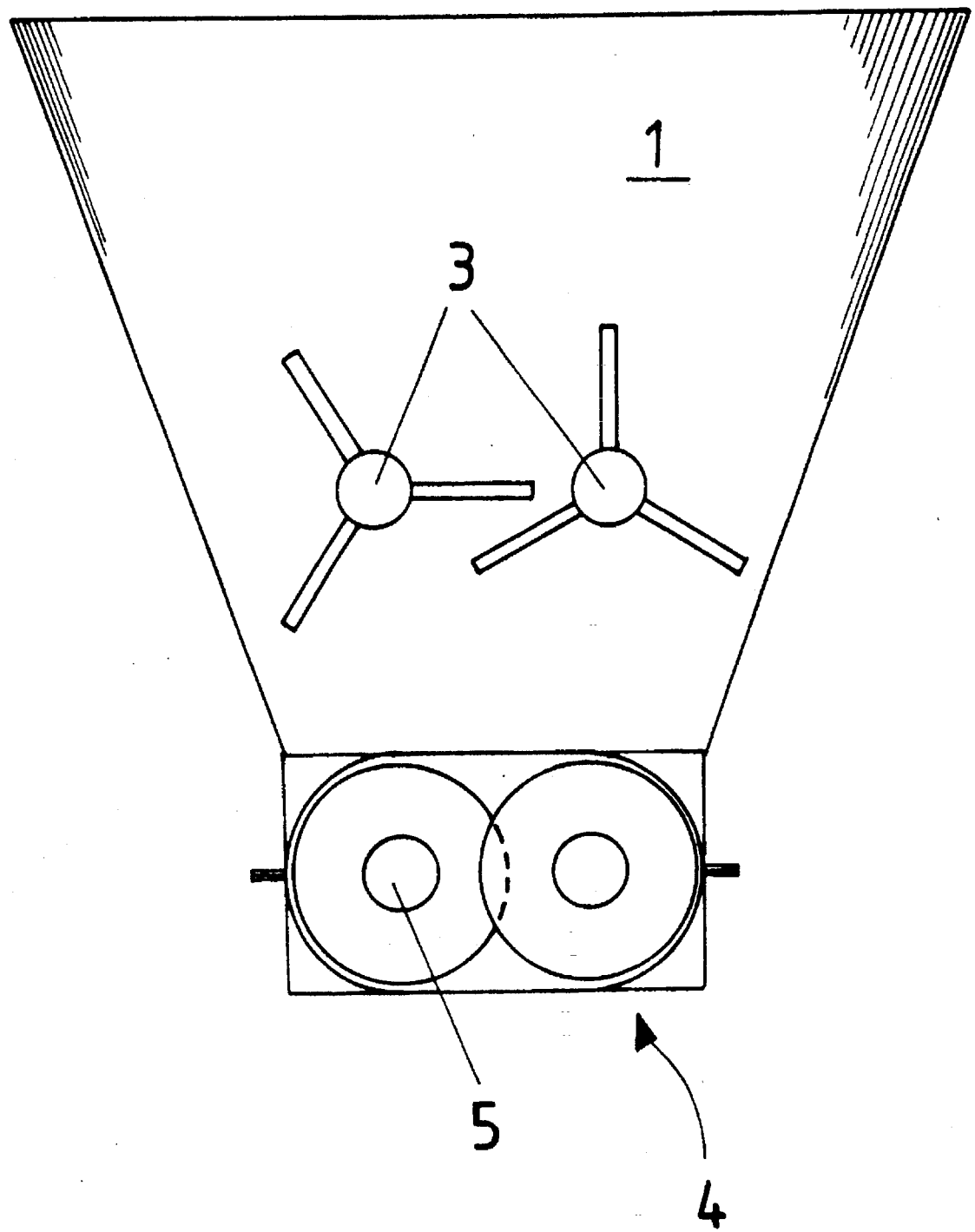
FIG. 3 shows a cross-section of FIG. 1 at point III—III

The principal components of the mixer in FIG. 1 are the silo 1 and the double screw 4 at the foot of it, continuations of the screws 5 being located in pipe 12. The pipe feeding sludge is joined to connection 15 and the sludge is sprayed longitudinally on top of screws 5 by means of a nozzle 2. Peat is loaded into the silo 1 by some suitable method. In practice the peat need not be fed into the silo absolutely evenly, rather it can be fed in suitable batches.

The silo includes two auxilliary mixers 3, by means of which the arching of peat in the silo 1 is prevented. The screws 5 located on the foot of the silo 1 continue inside pipe 12 up to a distance of about 30 cm of the end of the pipe. The free initial parts of the screws 5 here form the mixer 8 proper. A nozzle component 10 is attached the the end of pipe 12, this including a nozzle opening adjustable with bolts 11. The final section of pipe 12 and the nozzle component 10 form a pressurization chamber 9, through which the peat-sludge mass must travel before bursting out of nozzle 10. During the delay caused by this the sludge is able to be well absorbed by the peat mass.

The auxilliary mixers 3 and the screws 5 are here equipped with their own electric motor transmission units 6 and 7, but their operation can also be combined in a single motor. In practice it has been shown that a suitable rotational speed for the double screws 5 (diameter D=240 mm) is about 120 rpm and correspondingly a suitable speed for the mixer axle would be 30–50 rpm. The pitch of the screws is about the same as the diameter. The mixer will tolerate a certain degree of unevenness in the feed of sludge and peat, but the feeding of too much sludge alone must be avoided, because then the sludge begins to circulate in the screw conveyor, nor does the mass move forward any longer. Generally the problem disappears when balancing peat is fed to the silo. The best results are achieved by feeding peat and sludge to the mixer in an even flow.

Here the double screw 4 forms both a screw conveyor and a pressurization unit.

Figure 5:
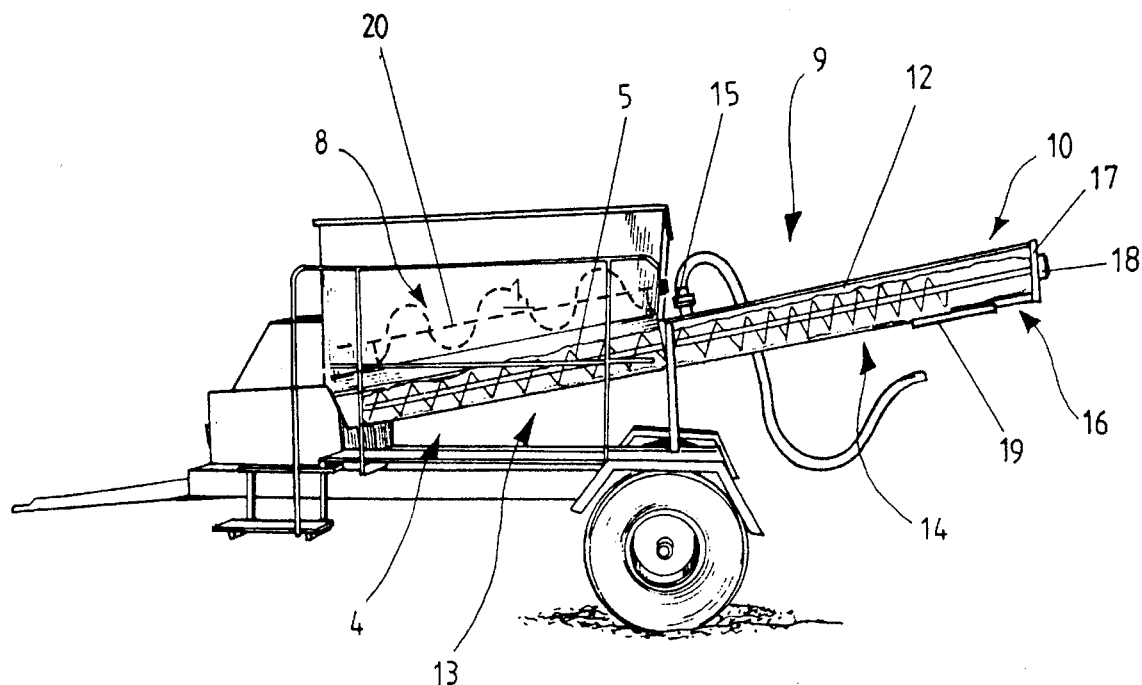
FIG. 5 shows the mixer in FIG. 4 seen from the side
Figure 4:
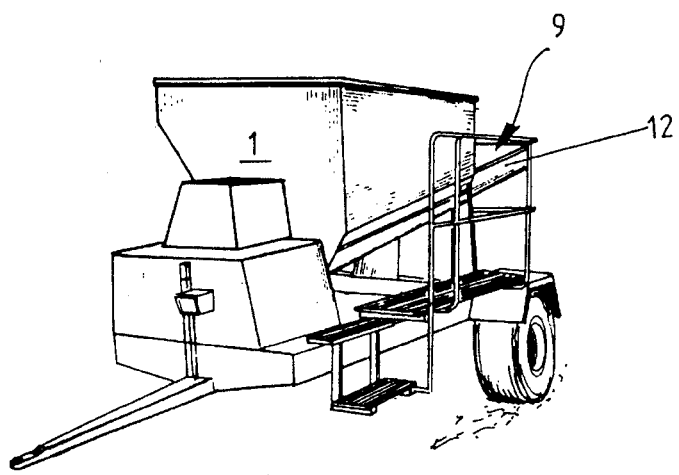
FIG. 4 shows another kind of mixer

According to the latest research the best form of application is regarded as being a mixer in accordance with FIGS. 4 and 5. In FIGS. 4 and 5 the same reference numbers are used for components that are operationally the same as those in FIGS. 1–3. These are a silo 1, the sludge feed connection 15, the double screw conveyor 4, its screws 5, the mixer 8 formed by their initial section, a pressurization chamber 9 formed by pipe 12, and nozzle component 10. The end of pipe 12 includes an end plate 17, on which the bearings 18 carrying screws 5 can easily be installed.

From the point of view of loading and in order to prevent arching one side of the silo 1 is vertical. The double-screw conveyor 4 is in a position that rises. In addition the sludge feed connection 15 is mounted on the pipe 12, reducing the height of the device, this assists the feed of the sludge. Here the sludge is introduced simply by joining its connection 15 to the start of the pipe 12, in which case the real mixing of the sludge takes place in the first part of pipe 12. By means of this arrangement a continual flow of peat into the pressurization chamber 9 is ensured. The length of the closed section of the pipe 12 is about 3 m. In mixers in accordance with FIGS. 1–3 a phenomenon was observed, in which the sludge alone began to circulate in the screws 5, this being due to the effect of an uneven feed.

A separate pressurization section is not required in pipe 12, because the pitch of the end 14 of the screws 5 is less than that of the beginning 13. There is an opening 16 formed by nozzle 10 at the end of pipe 12, which can be adjusted by means of plate 19 moving in guides. The reduction in pitch (20%) at the end creates the required increase pressure here and the nozzle component 10 is formed simply by the discharge opening formed in the end of pipe 12.

The rotation of the screws 5 takes place by means of a tractor. A cardan shaft in connected between its power-take-off and the continuation gear of the screws 5. Naturally the mixer can also be equipped with its own motor.

In this mixer a pre-mixing screw 20 is used, which returns the mass to the beginning of the screw conveyor 4. Thus effective pre-mixing is achieved.

By using the mixer of FIGS. 4 and 5 25 m³/h of very wet sludge can be mixed in a ratio 1:1 by volume with peat, when the motor output is 40 kW. The mixing ratio of the mass can be varied within broad limits. The maximum pressure appears to be 15–20 bar. The pressure remains at more than 10 bar for even more than 10 seconds. In order for the mixing to succeed a guide value can be given, according to which the pressure should remain at at least 8 bar (abs) for at least 3 seconds, preferably more than 5 seconds.

The pressurization device can also be formed in a manner differing from the abovementioned form of application. Even though a double screw has its own mixing effect, it is also possible to use a single screw. The movement and pressurization can also be created by means of a piston device. Here the technique that is as such known from sod peat machines can be exploited. What is essential in the device is principally the fact that a considerable pressure arises at the end of the screw, by means of which the sludge is forced into the peat.

I claim:

1. A peat and sludge mixer for mixing peat and sludge into a homogeneous mass, comprising:

a feed silo (1) to receive peat;

a screw conveyor (4) having a beginning located on a bottom of the feed silo to receive peat loaded into the silo and to act as a mixer (8) and a transfer device for the peat;

the screw conveyor being equipped with at least one cored screw and means operatively connected to he screw to rotate the screw;

a pressurization chamber formed by a pipe (12) surrounding at least a portion of the cored screw that extends beyond the feed silo to an end of the screw remote from the feed silo, so that the cored screw forces peat from the feed silo into the pressurization chamber;

a sludge feed connection (15) attached to the pipe at an end thereof proximate to the feed silo so as to feed sludge directly into the pipe and thus into the peat being forced through the pressurization chamber, a constricted discharge opening at the end of the pipe remote from the silo, so that the peat received by the screw conveyor is mechanically mixed with sludge fed into the pipe and the mixture is moved through the pressurization chamber by the screw conveyor to pressurize the mixture for a predetermined minimum time for absorption before arriving at the constricted discharge opening, forcing the sludge into the peat in opposition to the surface tension of the sludge, whereby the sludge is absorbed by and bound in the peat; and wherein the screw (5) extends up to and ends at least three screw diameters from the opening of the constricted discharge opening, so that a delay increasing the absorption time is obtained in the pressurization.

2. A peat and sludge mixer for mixing peat and liquid sludge into a homogeneous mass, comprising:

a feed silo (1) to receive peat;

a screw conveyor (4) having a beginning located at a bottom of the feed silo to receive peat loaded into the silo and to act as a mixer (8) and a transfer device for the peat;

the screw conveyor being equipped with at least one cored screw having a solid core extending without interruption from the feed silo to an end of the screw remote from the feed silo;

means operatively connected to the screw to rotate the screw;

a pressurization chamber formed by a pipe (12) surrounding the cored screw from the feed silo to the remote end of the screw, so that peat from the feed silo becomes pressurized within the pipe as the cored screw forces the peat through the pipe from the silo to the remote end;

a sludge feed connection (15) attached to the pipe at an end thereof proximate to the feed silo and having the solid core of the screw within said proximate end, so that the sludge feed connection is operative to introduce the sludge directly into the pressurization chamber at a location including the solid core and thus to introduce the sludge into the peat being forced through the pressurization chamber by the cored screw;

a discharge opening forming a nozzle at the remote end of the pipe (12) remote from the feed silo, so that the peat received by the screw conveyor is mechanically mixed with the sludge introduced into the pipe as the cored screw moves the mixture of peat and sludge through the pressurization chamber;

means to pressurize the mixture for a predetermined minimum time before the mixture arrives at and is forced through the nozzle, thereby forcing the sludge into the peat in opposition to the surface tension of the sludge whereby the sludge is absorbed by and bound in the peat; and said means to pressurize comprises a plate operatively associated with the discharge opening so as to adjust the area of the discharge opening and thereby adjust the pressure on the mixture being forced through the discharge opening.

3. A peat and sludge mixer for mixing peat and liquid sludge into a homogeneous mass, comprising:

a feed silo (1) to receive peat;

a screw conveyor (4) having a beginning located at a bottom of the feed silo to receive peat loaded into the silo and to act as a mixer (8) and a transfer device for the peat;

the screw conveyor being equipped with at least one cored screw having a solid core extending without interruption from the feed silo to an end of the screw remote from the feed silo;

a pressurization chamber formed by a pipe (12) surrounding the cored screw from the feed silo to the remote end of the screw, so that peat from the feed silo becomes pressurized within the pipe as the cored screw forces the peat through the pipe from the silo to the remote end;

a sludge feed connection (15) attached to the pipe at an end thereof proximate to the feed silo and having the solid core of the screw within said proximate end, so that the sludge feed connection is operative to introduce the sludge directly into the pressurization chamber at a location including the solid core and thus to introduce the sludge into the peat being forced through the pressurization chamber by the cored screw;

a discharge opening forming a nozzle at the end of the pipe (12) remote from the feed silo, so that the peat received by the screw conveyor is mechanically mixed with sludge introduced into the pipe as the cored screw moves the mixture of peat and sludge through the pressurization chamber;

means to pressurize the mixture for a predetermined minimum time before the mixture arrives at and is forced through the nozzle, thereby forcing the sludge into the peat in opposition to the surface tension of the sludge whereby the sludge is absorbed by and bound in the peat;

said means comprises an end plate closing the end of the pipe remote from the feed silo; and the discharge opening of the nozzle being formed in the pipe adjacent to the end plate.

4. The mixer as in claim 3 further comprising a plate operatively associated with the discharge so as to adjust the area of the discharge opening and thereby adjust the pressure on the mixture being forced through the discharge opening.

* * * * *